United States Patent Office 3,076,794
Patented Feb. 5, 1963

3,076,794
VINYL CHLORIDE POLYMERIZATION PROCESS WITH METAL ALKYL CATALYST
Otto Nicolas Schnack, Uccle-Brussels, and Robert De Coene, Woluwe-St-Lambert, Brussels, Belgium, assignors to Solvic Societe Anonyme, Brussels, Belgium, a Belgian company
No Drawing. Filed Apr. 3, 1959, Ser. No. 803,337
Claims priority, application Belgium Apr. 5, 1958
6 Claims. (Cl. 260—92.8)

The present invention concerns a new process of polymerization of vinylchloride and the polymers obtained by this process wherein use is made of new and particularly active catalysts capable of permitting the polymerization of vinyl chloride at low temperatures, under atmospheric pressure.

The process forming the object of the invention consists in polymerizing vinyl chloride in the presence of a catalyst constituted by organo-metallic derivatives corresponding to the general formula $MR_n$, wherein M is a metal of group I, II or III of the periodic classification of the elements selected from alkali metals, beryllium, cadmium, zinc, mercury, aluminum, gallium, indium and thallium, R is any alkyl radical, which may be branched, and $n$ is 1, 2 or 3 dependent on whether the metal is of group I, II or III.

When the metal is of group II or III, a branched alkyl radical is preferably selected.

In the particular case of organic derivatives of metals of group II of the periodic classification of the elements it has been found that it is possible to activate the polymerization by adding to the reaction mixture a small quantity of a transitional metal salt such as silver, copper or titanium. In such a case the quantity of activator to be used does not exceed 10% by weight of the quantity of the catalyst in the reaction mixture.

The quantity of catalyst to be used is of the order of 0.1 to 5% by weight of the quantity of the monomer to be polymerized.

Some organo-metallic derivatives answering the general formula $MR_n$ are very sensitive to the action of oxygen and water as is the case with organic derivatives of alkaline metals. It is, therefore, advisable to work in an atmosphere free from oxygen and to exclude any trace of water.

The polymerization of vinyl chloride in the presence of the new catalysts can be carried out in bulk or in an inert organic solvent. Depending on the temperature at which the polymerization is carried out use is made of a vessel under atmospheric pressure or of an autoclave at a pressure higher than atmospheric pressure.

The polymers prepared according to the present method have a high degree of crystallinity, determined by X-ray analysis, and an improved heat resistance.

The following examples permit an understanding of the details of the invention. It must be understood that they are given by way of illustration and that they do not limit in any way the scope of the invention which is capable of being varied.

*Example 1*

Among the organic derivatives of alkali metals the alkyl derivates of lithium and more particularly n-butyl lithium are especially active. The quantity of n-butyl lithium to be used is comprised preferably between 0.1 and 3% by weight of the quantity of the monomer to be polymerized.

5 g. of n-butyl lithium are dispersed with stirring in a flask equipped with a reflux condenser in one liter of a solvent consisting of 50% by weight of anhydrous heptane and 50% by weight of anhydrous octane, in the absence of air. While maintaining an inert atmosphere above the solution by bubbling dry nitrogen through it the temperature of the medium is brought to −50° C. 500 g. of vinyl chloride are added to this medium while stirring is continued. Polymerization is carried out at −50° C. in an inert atmosphere and the conversion rate is 20% after 24 hours.

The degree of crystallinity of polyvinyl chloride thus obtained is 25%; its Fikentscher K index is 97. On the other hand, a polyvinyl chloride prepared by a "usual" suspension process has a degree of crystallinity of 5% and a Fikentscher index of 71.

*Example 2*

The operation is repeated similar to that described in Example 1 but it is carried out at 0° C. in an autoclave. In order to obtain the same conversion rate of 20% a polymerization time of only 8 hours is required.

*Example 3*

The operation is repeated similar to that described in Example 1 but it is carried out at 30° C. in an autoclave. In order to obtain the same conversion rate of 20% a polymerization time of only 3 hours is required.

*Example 4*

500 g. of liquid vinyl chloride are placed at −40° C. in a bulb equipped with a reflux condenser and stirrer after the air has been evacuated by a current of pure and dry nitrogen. 5 g. of di-tert.butyl beryllium are added thereto. During polymerization the temperature is kept at −40° C. with stirring. At the end of 5 hours, 13 g. of polyvinyl chloride are obtained.

By working under similar conditions but in the presence of n-butyl beryllium, 5 g. of polyvinyl chloride are obtained at the end of 5 hours of polymerization.

*Example 5*

100 g. of vinyl chloride are placed at −25° C. in a flask equipped with a reflux condenser and stirrer, in the absence of air and moisture. 5 g. of dimethyl cadmium are added thereto. During polymerization, the temperature is kept at −25° C. with stirring. After 3 hours, 4 g. of polyvinyl chloride are obtained.

By working under similar conditions but adding to the reaction medium 0.5 g. of titanium tetrachloride, 15

*Example 6* g. of polyvinyl chloride are obtained at the end of 3 hours.

500 g. of vinyl chloride are placed at −25° C. in a flask equipped with a reflux condenser and stirrer, in the absence of air and moisture. 3 g. of diethyl zinc are added thereto. During polymerization the temperature is kept at −25° C. with stirring. At the end of 5 hours, 10 g. of polyvinyl chloride are obtained.

By working under similar conditions but by adding to the reaction mixture 0.3 g. of cupric chloride, 24 g. of polyvinyl chloride are obtained after 5 hours polymerization.

*Example 7*

100 g. of vinyl chloride are placed at −25° C. in a flask equipped with a reflux condenser and stirrer, in the absence of air. 5 g. of diethyl mercury are added thereto. During the entire polymerization the temperature is kept at −25° C. with stirring. At the end of 12 hours, 6 g. of polyvinyl chloride are obtained.

By working under the same conditions but by adding to the reaction mixture 0.5 g. of silver nitrate 32 g. of polyvinyl chloride are obtained at the end of 12 hours.

*Example 8*

100 g. of liquid vinyl chloride are placed at −25° C.

in a flask equipped with a reflux condenser and stirrer, in the absence of air and moisture. 1 g. of di-tert. butyl gallium is added thereto. During polymerization the temperature is kept at −25° C. with stirring and at the end of 10 hours, 19 g. of polyvinyl chloride are obtained.

*Example 9*

250 g. of liquid vinyl chloride are placed at −35° C. in a flask equipped with a reflux condenser and stirrer, in the absence of air and moisture. 3 g. of tri-ethyl indium are added thereto. The temperature is kept during polymerization at −35° C. with stirring. After 48 hours, 22 g. of polyvinyl chloride are obtained.

*Example 10*

500 g. of liquid vinyl chloride are placed at −20° C. in a flask equipped with a reflux condenser and stirrer, in the absence of air and moisture. 2 g. of tri-isopropyl thallium are added thereto. The temperature is kept during the entire polymerization at −20° C. with stirring. At the end of 4 hours, 37 g. of polyvinyl chloride are obtained.

*Example 11*

100 g. of liquid vinyl chloride are placed at −25° C. in a flask equipped with a reflux condenser and stirrer, in the absence of air and moisture. 5 g. of tri-isobutyl aluminium are added thereto. The temperature is kept during polymerization at −25° C. with stirring and at the end of 5 hours, 22 g. of polyvinyl chloride are obtained.

*Example 12*

100 g. of liquid vinyl chloride are placed at −35° C. in a flask equipped with a reflux condenser and stirrer, in the absence of air and moisture. 5 g. of tri-isopropyl aluminium are added thereto. The temperature is maintained during polymerization at −35° C. with stirring. After 20 hours of polymerization 17 g. of polyvinyl chloride are obtained.

The examples show the surprising activity of the new catalysts since at temperatures as low as −50° C. polyvinyl chloride is obtained in satisfactory yields.

We claim:

1. A process for the homopolymerization of vinyl chloride which comprises effecting polymerization at a temperature of −50° C. to 30° C. in the presence of a catalyst consisting of a compound having the formula $MR_n$, wherein M is a metal selected from the group consisting of the alkali metals, beryllium, cadmium, zinc, mercury, aluminum, gallium, indium and thallium, R is an alkyl radical up to 4 carbon atoms, and $n$ is an integer ranging from 1 to 3 depending upon the valence of M, said catalyst being present in the amount of 0.1 to 5% by weight of the vinyl chloride.

2. Process according to claim 1 wherein the catalyst is an alkyl derivative of lithium.

3. Process according to claim 2 wherein the quantity of alkyl lithium preferably used is preferably 0.1 to 3% by weight of the quantity of the monomer to be polymerized.

4. Process according to claim 2 wherein the catalyst is n-butyl lithium.

5. Process according to claim 1 wherein R is a branched alkyl radical.

6. Process according to claim 1 wherein polymerization is carried out in bulk.

References Cited in the file of this patent

UNITED STATES PATENTS

| 2,846,427 | Findlay | Aug. 5, 1958 |
| 2,910,461 | Nowlin et al. | Oct. 27, 1959 |

OTHER REFERENCES

Natta et al.: Atti dei Lincei, Rendiconti (Fisici), Vol. XXIV, pages 381–389 (1936).